Oct. 25, 1938.　　R. T. KILLMAN ET AL　　2,134,483
APPARATUS FOR PRINTING MOTION PICTURE COLOR FILM
Filed Nov. 16, 1936　　3 Sheets-Sheet 2
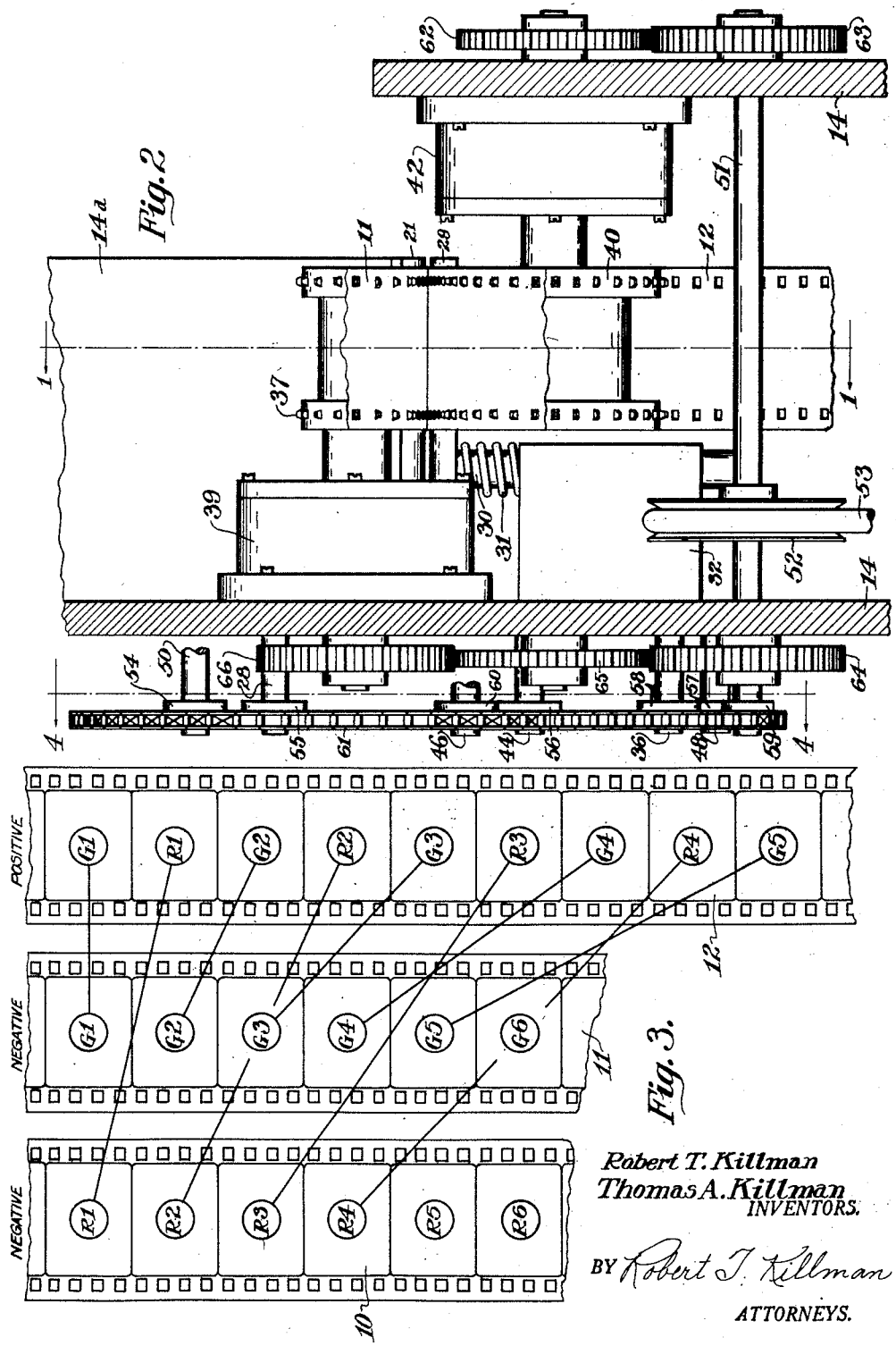

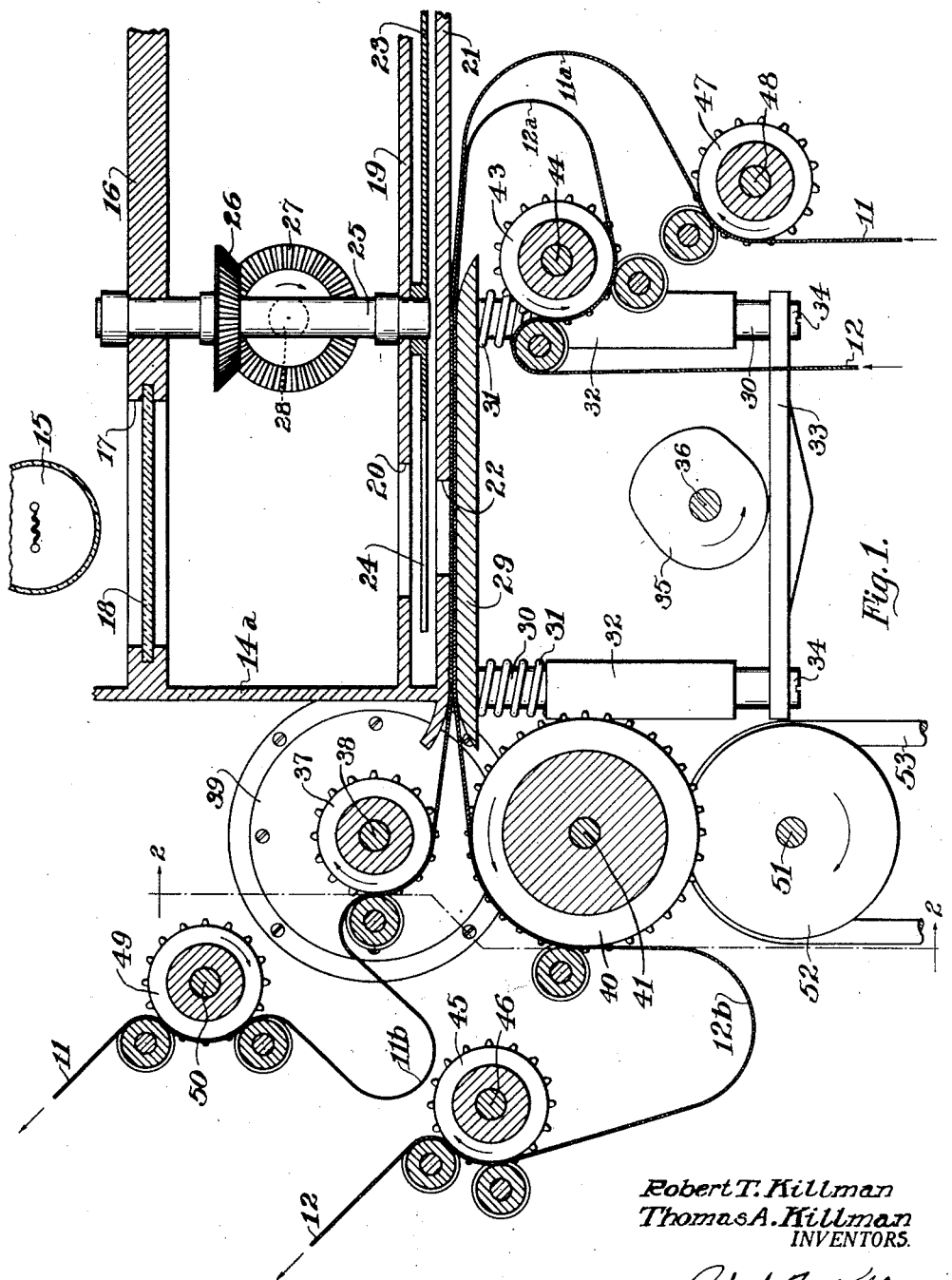

Oct. 25, 1938.  R. T. KILLMAN ET AL  2,134,483
APPARATUS FOR PRINTING MOTION PICTURE COLOR FILM
Filed Nov. 16, 1936  3 Sheets-Sheet 3
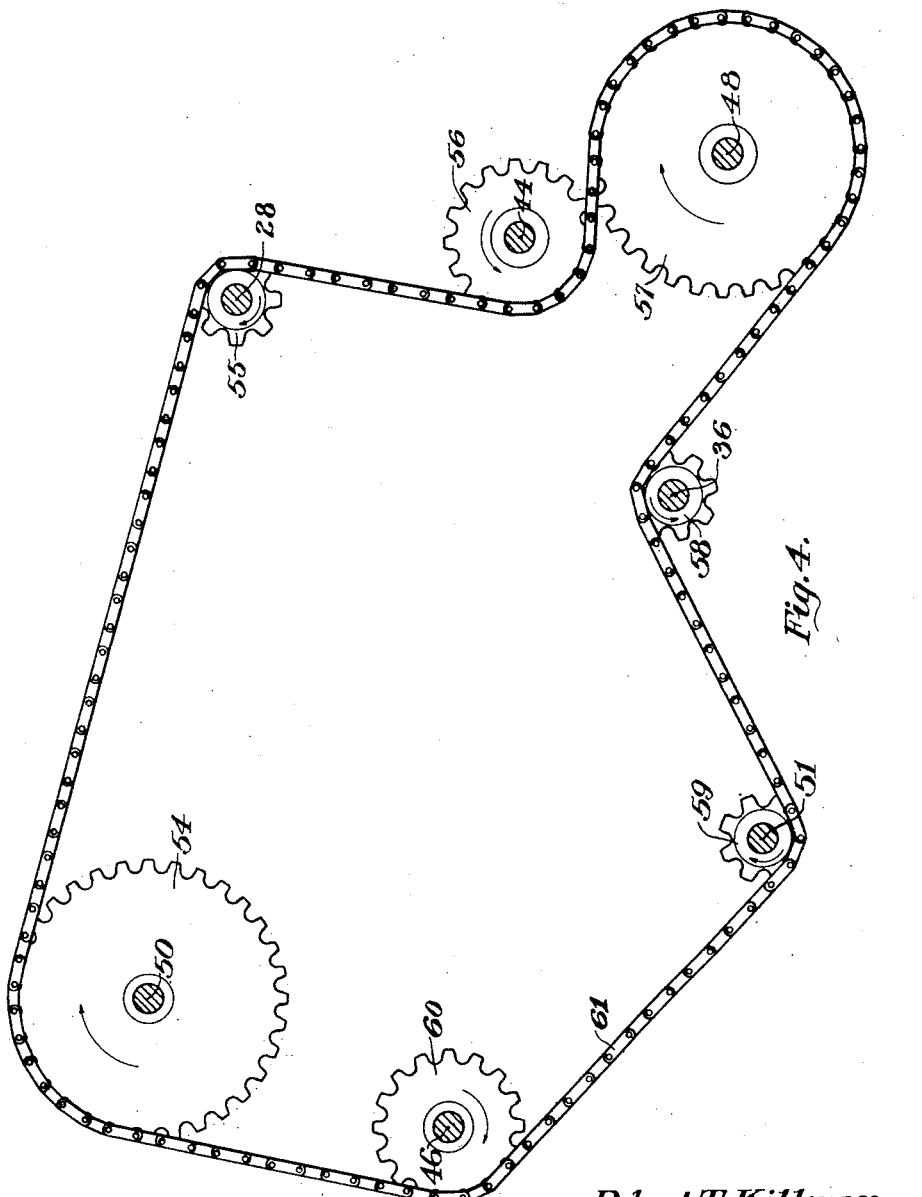
Robert T. Killman
Thomas A. Killman
INVENTORS.
BY Robert T. Killman
ATTORNEYS.

Patented Oct. 25, 1938

2,134,483

UNITED STATES PATENT OFFICE 2,134,483

APPARATUS FOR PRINTING MOTION PICTURE COLOR FILM

Robert T. Killman and Thomas A. Killman, Nashville, Tenn.

Application November 16, 1936, Serial No. 110,962

1 Claim. (Cl. 95—75)

This invention relates to apparatus for printing motion picture film, and more particularly to apparatus for printing, from color separation negatives, as for example "bi-pack" negatives, a positive film of the type specified for use with the colored motion picture projection apparatus disclosed in our United States Patent No. 2,060,503 filed Sept. 16, 1935, and issued Nov. 10, 1936. The type of film specified in the above patent consists of a succession of pairs of color separation positive images, each of the two images of a pair being made simultaneously so as to record an identical motion phase of the subject matter. There are several different methods of securing such a positive film. One method is by direct printing from a color separation negative as produced by a camera mechanism as disclosed in our United States Patent No. 2,060,505 filed Feb. 26, 1936, and issued Nov. 10, 1936.

Another method makes use of a pair of so-called "bi-pack" color separation negatives which are well known in the art, and it is among the objects of this present invention to disclose apparatus for producing such a positive film from bi-pack color separation negatives or from negatives of similar image characteristics, it of course being understood that the two negatives may have been placed side by side etc. and by the use of some such device as a beam splitter the same result gained as if the two negatives had been exposed in the bi-pack arrangement.

It is therefore an object of this invention to provide apparatus for printing two color separation negatives having the same image characteristics as bi-pack negatives in combination upon a single positive film in such manner that the resulting positive film will consist of successive pairs of color separation images, the two images constituting each pair being of the same motion phase of the subject and in which successive pairs of images are of successive motion phases of the subject.

Another object of this invention is to provide means whereby adjacent frames of a negative film may be printed upon a positive film in a spaced relation in such manner that the adjacent images of a second negative may be printed upon the same positive film so as to occupy the spaces left between the images printed from the first negative film. The apparatus by which these and other objects which will presently appear are accomplished are best understood by referring to the following specification and to the accompanying drawings in which, Figure 1 is a side elevation of a section of the device taken along the line 1—1 of Figure 2, Figure 2 is an end elevation of a section of the device taken along the line 2—2 of Figure 1, Figure 3 is a diagram showing the method of placing the images from the two negatives upon the positive film, and Figure 4 is a side sectional view taken along the line 4—4 of Figure 2 showing the method of driving the shutter and the continuous film feed sprockets.

In the drawings (see Figure 3) the numeral 10 designates the one of a pair of color separation negatives, exposed in a motion picture camera by the "bi-pack" method or its equivalent, which carries images of the subject photographed by red light, and the numeral 11 designates the negative of the same pair which carries the images of the subject photographed by green light. The image in the frame R1 of the negative 10 and the image in the frame G1 of the negative 11 are presumed to have been made simultaneously so as to record identical motion phases of the subject. Similarly frames R2 and G2 are to be made simultaneously etc. The numeral 12 designates a positive film, printed according to this invention. The lines drawn between the circles on the negatives and those on the positive show the location, upon the positive, of the frames printed from the two negatives. The method of printing is as follows: The exposed negative 11 and the unexposed positive film 12 are passed through a printing device, to be described later, and the frames G1, G2, etc., are printed from negative 11 to positive 12. By means of two intermittent mechanism, one for the negative and one for the positive, the positive is advanced a space equal to two frames and the negative is advanced one frame between each printing. A shutter mechanism cuts off the printing light during the period the films are being advanced. Thus the frames G1, G2, G3, etc., are all printed upon the positive but an unexposed space equal to a frame is left between each frame printed. Then the positive film is again passed through the printing mechanism. This time with the negative film 10 and the frames R1, R2, R3, etc., are printed upon the positive film in the spaces left unexposed in the previous printing. Upon completion of this operation the sequence of frames upon the positive film 12 will be G1, R1, G2, R2, etc., as shown in Figure 3. After developing and other suitable processing the positive film 12 will be ready to project by means of the projection apparatus described in our United States Patent No. 2,060,503 or other suitable means.

In order that the positive film 12 shall be the same length for any given scene as the standard films now in use, it is contemplated that the camera mechanism used to expose the two negatives 10 and 11 shall operate at one-half normal speed. Since a film speed of twenty-four frames per second may be considered standard for professional projection, we therefore contemplate that the two negatives 10 and 11 shall be advanced by the camera at the rate of twelve frames per second, but due to the "bi-pack" arrangement since two frames (one on the front negative and one on the back negative) are exposed simultaneously, there will be exposed twenty-four frames per second. The positive film will, after the double printing operation above described, be twice as long as either one of the negatives. Since each negative film is one-half standard length, the positive will be standard length for any given scene, and is to be advanced at the rate of twenty-four frames per second in the projector.

The fact that the camera mechanism is operated at one-half standard speed is productive of several material benefits, one of the most important being that since each exposure occupies twice the time which is allowable in standard cinematography, less powerful lighting is required on the subject, resulting in lower lighting costs, less glare and disturbance to the actors; or slower lenses may be used and greater depth of focus secured.

Although only half as many motion phases of a moving object are recorded as in standard speed cinematography, the fact that moving objects are blurred in the direction of their motion twice as far on each frame as in cinematography at standard speed causes the projected picture to present an illusion of smoothness and fluidity of motion which is satisfactory in every way.

The mechanism by which the above described printing operations are carried out is best understood by reference to Figures 1, 2 and 4 and comprises a frame 14 upon which is mounted the light tight box 14a which contains the printing lamp 15, light from which passes through the ground glass plate 18 covering the window 17 in the partition 16, through window 20 in a second partition 19, through the opening 24 in the rotary shutter 23 to the printing aperture 22, located in the lower face 21 of box 14a against which the negative film 11 and the positive film 12 are pressed in intimate contact by the shoe member 29. Shutter 23 is mounted upon a vertical shaft 25, journalled in the partitions 16 and 19, and which has mounted thereupon the bevel gear 26 which meshes with a similar bevel gear 27, mounted upon the horizontal shaft 28 which extends through the rear wall of the frame 14 and has mounted upon the end thereof the sprocket gear 55.

The films are drawn past the printing aperture intermittently, the negative film 11 by the intermittent sprocket 37 mounted upon the intermittent shaft 38, and the positive film by the intermittent sprocket 40 mounted upon the intermittent shaft 41. The film sprocket 37 is rotated intermittently through angles of ninety degrees by the intermittent mechanism contained within the intermittent casing 39. This intermittent mechanism, which may be of any of the well known types, is in turn driven from the main power shaft 51 by means of the gear train composed of the driven gear 66, the idler gear 65, and the driver gear 64. The film sprocket 40 is also rotated intermittently through angles of ninety degrees, in synchronism with sprocket 37, but in the opposite direction, by a suitable intermittent mechanism contained within the casing 42, and which is driven from the main power shaft 51 by the driven gear 62 and the driver gear 63. Film sprocket 40 has a diameter twice that of sprocket 37 and therefore, although they turn simultaneously through the same angle, it will be seen that in turning through this angle the sprocket 40 advances the positive film 12 twice as far as the sprocket 37 advances the negative film 11. The parts are so arranged that the negative film 11 is advanced one frame and positive film two frames by every operation of the intermittents. The main power shaft 51 is coupled to a suitable source of power by means of the pulley 52 and the belt 53.

The negative film 11 is fed to the intermittent mechanism from a suitable supply reel by means of the continuously rotating sprocket 47, mounted upon the shaft 48 which extends through and is journalled in frame 14 and has the chain sprocket gear 57 mounted upon its extending end, and is fed from the intermittent mechanism to a suitable take-up reel by means of the continuously rotating sprocket 49 mounted upon the shaft 50 which extends through and is journalled in the frame 14 and has the chain sprocket gear 54 mounted upon its extending end, suitable slack film loops 11a and 11b being used to isolate the intermittently moving film from the continuously moving film. In a similar manner the positive film 12 is fed to the intermittent mechanism from a suitable supply reel by means of the continuously rotating sprocket 43, mounted upon the shaft 44 which extends through and is journalled in the frame 14 and has the chain sprocket gear 56 mounted upon its extending end, and is fed from the intermittent mechanism to a suitable take-up reel by means of the continuously rotating film sprocket 45 mounted upon the shaft 46 which extends through and is journalled in the frame 14 and has the chain sprocket gear 60 mounted upon its extended end, suitable slack film loops 12a and 12b being used to isolate the intermittently moving film from the continuously moving portion. All of the film sprockets are provided with suitable film guide rollers.

The pressure shoe 29 is mounted upon the two vertical slide rods 30, which are slidably mounted in the projections 32 extending out from the rear wall of frame 14, and is normally urged upward against the lower plate 21 of the light box 14a by the springs 31. The rods 30 extend downward and project through the members 32 and are joined at their lower ends by the cam follower plate 33. Cam 35 mounted upon shaft 36, which extends through and is journalled in frame 14 and which has mounted upon the extending end thereof the chain sprocket gear 58, is located at a point just above plate 33 in such manner that rotation of the cam 35 will cause a vertical reciprocatory motion of plate 33, rods 30 and shoe 29, alternately gripping and releasing the two films between shoe 29 and plate 21. The chain sprocket gears above mentioned are all joined and driven by the sprocket chain 61 from the sprocket gear 59 mounted upon the main power shaft 51. The direction of rotation of all gears and sprockets is indicated by arrows on Figures 1 and 4.

A cycle of operation of the device is as follows. Assume that the mechanism is properly threaded with the two films 11 and 12 and that the two films are at rest under the aperture 22 and that light from lamp 15 is passing through the ground glass 18 and is falling upon the films and printing an image from negative film 11 upon positive film 12, shutter 23 now being open. Loops 11a and 12a are increasing in size as film is drawn from the supply reels by film sprockets 43 and 47. Loops 11b and 12b are decreasing in size as film sprockets 45 and 49 feed film therefrom to the take-up reels. As the shutter revolves it intercepts and cuts off the light falling upon the film, cam 35 depresses plate 33 thus releasing the pressure of shoe 29 upon the films. Then the intermittents operate to draw the films forward, intermittent sprocket 37 drawing the negative film forward one frame and intermittent sprocket 40 drawing the positive film forward two frames. Upon the completion of this movement cam 35 allows shoe 29 to again exert pressure upon the films, shutter 23 admits light to fall upon the films and the printing of the next frame of negative begins, thus completing the cycle. It is of course obvious that suitable pilot pins may be made use of, if desired, either on shoe 29 or upon plate 21 in order to more perfectly register the two films. Upon completion of the printing of the negative 11, the same positive film 12 is again placed in the device with the negative 10 and so placed relative thereto that the images from negative 10 are printed upon the positive in the frames left unexposed in the printing of negative 11.

Other forms from those here illustrated may be used without departing from the spirit or scope of the invention.

Having described our invention what we claim and desire to secure by Letters Patent is:

In a device for printing motion picture film, a frame comprising two mutually parallel side plates, a light box positioned between said plates and having three lower walls pierced by aligned apertures, a light source positioned in said box, a plate of light diffusing material covering the upper of said aligned apertures, a fan shutter disk having opaque blades, mounted for rotation between the two lowermost walls and operative to intermittently close the two lowermost apertures, a pressure plate forming with the lower surface of the lowermost of said wall a guiding means for the films to be printed, slide rods depending from and rigidly attached to said pressure plate, bearing members attached to one of said side plates and provided with bearing holes for receiving said slide rods for vertical sliding movement thereof, resilient members encircling said slide rods and interposed between said pressure plate and said bearing members and operative to urge said pressure plate upward against the lower surface of the light box, a cam follower plate connecting the lower ends of said slide rods, a cam member journalled for rotation in said side plates and cooperative with said cam follower plate to cause vertical reciprocatory motion of said pressure plate, means for moving a film intermittently one frame at a time past the aperture in the lowermost of the three lower walls of the light box, and means for advancing a second film intermittently, two frames at a time, between said first mentioned film and the pressure plate, both films being advanced simultaneously, said movement taking place only while the pressure of said pressure plate against said films is released by the action of the cam.

ROBERT T. KILLMAN.
THOMAS A. KILLMAN.